May 22, 1951 C. A. PHIPPS 2,554,058
MEANS FOR REMOVABLY SECURING WINDOW GLASS
Filed July 24, 1944
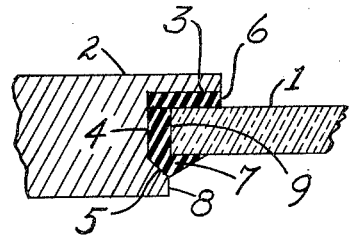
FIG. 1
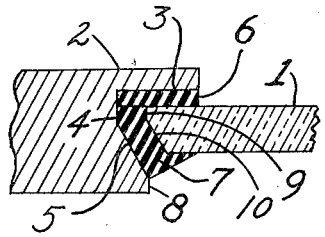
FIG. 2
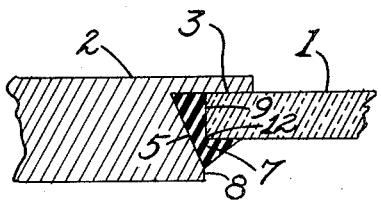
FIG. 3-A
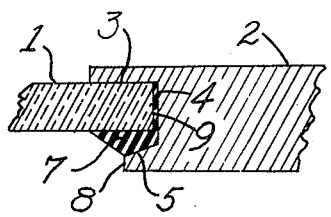
FIG. 3-B
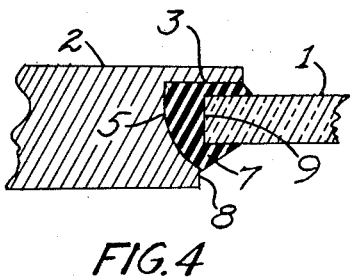
FIG. 4
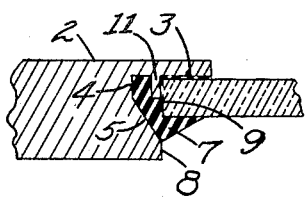
FIG. 5
INVENTOR
Charles A. Phipps.

UNITED STATES PATENT OFFICE 2,554,058

MEANS FOR REMOVABLY SECURING WINDOW GLASS

Charles A. Phipps, Hartsdale, N. Y.; Frank Northern Magill, executor of said Charles A. Phipps, deceased, assignor to Carolyn Magill Phipps, Hartsdale, N. Y.

Application July 24, 1944, Serial No. 546,374

7 Claims. (Cl. 189—78)

This invention relates to an improved method for fastening window glass into openings in a supporting structure, and more particularly to setting glass resiliently and removably in a metal sash, frame or the like. It also relates to the use of compositions for setting window glass comprising material selected from the group consisting of latex rubber, dispersed reclaimed rubber and synthetic rubber, in a manner to reduce the cost of manufacturing metal sash, installing window glass therein, and replacing broken glass.

An object of this invention is to provide a strong, resilient, removable mounting for window glass in a sash or other supporting structure, so as to hold the glass securely regardless of pressure on the glass or vibration; to entirely eliminate leakage around the glass; and to reduce the hazard of breakage.

Another object of this invention is to simplify the replacement of broken glass in a metal sash, and to not only enable this to be done without removal of the sash from the window frame, but to also simplify the operation to the extent that it is not necessary to remove screws, bolts, or other removable metal parts in order to replace the glass. A modification of this invention makes it possible to thus replace the glass from either side of the sash.

A further object of this invention is to employ the fewest possible structural members and to use only simple shapes, to obtain greatly improved economy of manufacture.

The economy of manufacture and ease of glass replacement are important features of the present invention, and are obtained by new and simplified methods, including a new use of resilient compounds which are applied in a semi-liquid state and solidify by hydration.

The use of pre-formed rubber gaskets, strips of rubber and the like in setting glass is well known, and usually comprises the use of a seal or mounting made of strips of rubber which are ordinarily clamped against one or both surfaces of the window glass along the edges of the glass. Various mechanical devices have heretofore been employed to clamp the rubber or the like against the glass, the most common being the use of auxiliary members such as screws, bolts, clamps or nails to draw a framework together in a clamping action, or to hold separate strips of metal tightly against the rubber. Numerous variations of such clamping or securing devices are now in use, and the present invention is clearly distinguished from all such devices by the complete absence of screws, bolts, clamps, nails, staples and the like for the application of pressure. The elimination of such auxiliary members simplifies the manufacture of window sash under the present invention and thus constitutes a distinct improvement.

A partial elimination of clamps and the like has heretofore been accomplished by the use of packing material forcibly inserted between the glass and the adjacent sash or frame. Such packing has been found to loosen during use and to leak air, dust and water while in service. At best it does not conform exactly with the entire surface of the glass edge and the adjacent surface of the sash or frame. The present invention is distinguished from such arrangements by the complete elimination of auxiliary clamping members and by the use of a semi-liquid material which fills every crevice of the abutting glass and sash surfaces and then solidifies by hydration, substantially without shrinkage, into a resilient solid which adheres to both surfaces and completely seals them against leakage.

The present invention is further distinguished from the prior art in that it provides a self-locking arrangement of the glass in the supporting structure, due to a new positioning of surfaces which puts the resilient material in compression and shear when pressure is exerted perpendicularly to the main surface of the glass in a direction which would tend to force it out of the opening in the supporting structure, such as would be exerted by a heavy wind or a sudden blast of air. Under such conditions, the resiliency of the said material permits a slight movement of the glass to absorb shock and to fully equalize the pressure around the periphery of the glass. Further movement is prevented by a binding or snubbing action of the compressed resilient material against a surface of the supporting structure provided for this purpose, securely locking the glass in place. Provision is made for readily removing the glass intact, for removing sections of broken glass, and for replacing the glass by withdrawing the resilient material between these carefully positioned surfaces. While the resilient material is being withdrawn in this manner, the application of tension reduces the thickness of the resilient material, thus permitting it to be withdrawn between the surfaces and also permitting the adhesive bond between the material and the surfaces to be progressively broken by a peeling action.

These and other features of the present invention will be apparent from the drawings and further description presented herewith. Although the present invention is described principally with relation to its use with window glass, it is equally useful in connection with the resilient and removable mounting of other objects, such as panels of plastic material, glass in lighting fixtures, glass covers for instruments and the like.

Referring to the drawings,

Figure 1 is a diagrammatic illustration in sectional elevation of a pane of glass, the edge of which is embedded in a resilient material holding it to a supporting structure.

Figure 2 is a modification of Figure 1 in which the edge of the glass is bevelled to provide a modified spacing for inserting and withdrawing the resilient material.

Figure 3-A is a modification of Figure 1 in which one surface of the glass is in contact with an abutting surface of the supporting structure. Fig. 3-B illustrates a pane of glass having one edge deeply positioned in a slot in the supporting structure. This arrangement is suitable when the other edges are less deeply embedded for easy removal.

Figure 4 is a modification of a portion of Figure 3 to illustrate a typical variation of the surface of the supporting structure; in this example a curved surface is shown.

Figure 5 is a modification of Figure 3 embodying a projection from a surface of the slot to aid in spacing the glass prior to inserting the resilient material.

Referring to the drawings in greater detail, Figure 1 illustrates a window glass or the like 1, and a supporting structure 2, which may be a metal sash, frame or the like, or may be of wood, plastic, or other material. A slot, shown in cross section with surfaces 3, 4 and 5 facing glass 1, is arranged longitudinally in the supporting structure 2 to receive an edge of glass 1. The slot is shaped to have a surface 3 substantially parallel with one of the faces of glass 1, and extending a short distance beyond edge 9 of the glass to form an area of support in which surface 3 overlaps the adjoining surface of the glass 1. Another surface 4 of the slot is substantially parallel to edge surface 9 of the glass, and an extension 5 of surface 4 is sloped toward the glass, terminating at surface 8 which does not extend beyond edge surface 9 of the glass. Surfaces 3, 4 and 5 are spaced from the glass to receive resilient material 6 and 7. Resilient member 6 may be of any suitable type, such as a strip of milled rubber. Resilient material 7 is preferably selected from the group consisting of latex rubber, dispersed synthetic rubber and dispersed reclaimed rubber, inserted as a semi-liquid and solidified in place by hydration. Examples of suitable formulations of this type are given herein. Surfaces 5 and 8 are arranged with respect to edge surface 9 of the glass so that any movement of glass 1 away from surface 3 will put resilient material 7 in shear between surfaces 8 and 9. Also, due to adhesion of resilient material 7 to surfaces 4 and 9, it will be placed in shear between those surfaces. The slope of surface 5 is such that any movement of the glass and its adhering resilient material 7 toward the general direction of surface 8 will put a substantial part of resilient material 7 in compression against surface 5. Such compression requires that the resilient material must find an outlet in another direction. However, the only available outlet, between edges of surfaces 8 and 9, is also restricted by such movement. The result is a snubbing action against surface 5 which, together with the resistance of the resilient material to shear, effectively cushions and stops the movement. The formulation of resilient material 7 may be adjusted, as hereinafter described, to not only provide adequate resistance to shear, but also to provide greater or less adhesion to the glass and supporting structure as may be required in any specific application. The resiliency of this material can also be adjusted as required. In applications where it is not important to later remove the entire glass or large sections of glass intact, resilient material 7 can be formulated to have very great adhesive properties so as to provide a permanent mounting which can only be removed by first taking out the glass after breakage has occurred. However, in most applications, it will be preferred to adjust the adhesive properties of this material to permit the entire glass, or large sections of glass after breakage, to be removed intact, while retaining adequate adhesion to obtain the full benefit of the snubbing action previously described. Such removal is effected by first loosening resilient material 7 from the glass near one corner of the window, using a knife for this purpose. The loosened material is then grasped with pliers and withdrawn outwardly through the opening between surface 5 and the nearest edge of the glass. This places the resilient material in tension, and reduces its thickness so that it readily passes through the restricted opening between surface 5 and the glass. A steady pull is exerted to progressively break the adhesive bond between resilient material 7 and the surfaces of the glass and supporting structure to which it is attached. Such action is the reverse of the compression and snubbing action which takes place while the window is in service, and serves to fully release the glass for removal. Resilient member 6 need not be removed, and may be suitably cemented in place. It serves as a resilient cushion between glass 1 and surface 3, and is shown as separate from resilient material 7 in order to facilitate the removal of said resilient material. In applications where such easy removal is not of great importance, resilient material 7 may be extended to include resilient member 6.

Figure 2 is a modification of Figure 1, in which at least a part of edge surface 9 is bevelled at 10 to substantially conform with the slope of surface 5, to facilitate the insertion and removal of resilient material 7, and also to assist in creating the snubbing action heretofore described, by providing a suitable bearing surface 10 on the edge of the glass to more fully engage resilient material 7 in compressing it against surface 5. In the example illustrated, surface 5 is optionally extended to occupy a large part of the surface of the slot opposite edge 9 and 10.

Figure 3-A illustrates further modifications of Figure 1, in which resilient member 6 is eliminated as a separate member. In this example, glass 1 either bears directly on overlapping surface 3, or is separated from it by a thin layer of resilient material 7 which may be used as a cement to seal the irregularities between these surfaces. Extension of resilient material 7 in a relatively thin film between the glass and surface 3 does not prevent the removal of the main portion of resilient material 7 as previously described. Figure 3-A also illustrates a reduced cross section of resilient material 7 at corner 12 of the glass, to optionally permit the resilient material 7 to be torn at the line of reduced cross section in preparation for removing the pane of glass, instead of withdrawing the entire body of resilient material 7. That part of the resilient material lying between surfaces 5 and 9 may then be removed after removal of the glass. Figure 3-A also illustrates an optional extension of surface 5 to meet surface 3, eliminating surface 4.

Figure 3-B illustrates a modification of Figure 1 having surfaces 4 and 5, without the use of resilient member 6 as a separate member. It also illustrates the deep insertion of one edge of a pane of glass into a slot of the type described in this disclosure, instead of limiting the insertion to avoid the overlapping of surfaces 8 and 9. This deep insertion is suitable if the other edges of the pane of glass, shown for example in Figure 3-A, are arranged to clear surface 8 during removal or installation, and avoids re-cutting glass which is oversize.

Figure 4 illustrates a modification of Figure 1 as an example of possible variations in the arrangement of surfaces. In the example shown, a curved surface 5 is introduced while remaining within the scope of the present invention. Thus, minor variations in the shaping of surfaces 3, 4, 5, 9 or 10 may be introduced for economy or other reasons, without destroying the snubbing action or other improvements disclosed in this invention.

In Figure 5, projection 11 from surface 3 assists in properly spacing the insertion of the glass in the slot during the setting of the glass. It is evident that projections from any of the surfaces of the supporting structure abutting the glass may be used for this purpose, and projection 11 is illustrative of the use of such projections.

In a further modification of this invention, surface 3 may be replaced by additional surfaces 5 and 8 in symmetrical arrangement with the surfaces 5 and 8 illustrated in Figures 1 to 5, inclusive, to provide a snubbing action on both sides of the glass, and to permit the glass to be removed from either side of the supporting structure. This feature is useful in the maintenance of double windows, and further simplifies the shape of the slotted edges of the supporting structure.

Resilient material 7 is preferably compounded to be applied as a semi-liquid or mastic. By varying its formulation, it may be adjusted to control the adhesion, resistance to shear, and resiliency of the solidified material as may be required for specific applications. A composition which is suitable for use in the present invention may be made as follows:

| | Parts |
|---|---|
| Rubber, in evaporated latex having 68% to 70% solids | 100 |
| 10% casein solution or other stabilizer | 5 |

Into this is stirred the following powder.

| | |
|---|---|
| Aluminous cement | 80 |
| Silica flour or other filler | 100 |
| Sulfur | 1 |
| Zinc oxide | 2 |
| Butyl zimate or equivalent accelerator | 1 |
| Anti-oxidant (Age-rite or equivalent) | 1 |

The adhesive properties of the above composition may be improved by increasing the ratio of aluminous cement to silica flour, and lessened by decreasing this ratio. Resiliency is improved by maintaining a low proportion of aluminous cement. The use of butyl zimate or equivalent as an accelerator aids in the development of resiliency and resistance to shear by effecting an "air cure" of the rubber. Increased amounts of accelerator and sulfur may be used to improve the resistance to shear.

It is ordinarily desirable to apply this composition as a stiff liquid or mastic. The consistency of the mix may be thickened by increasing the content of silica flour, aluminous cement, or both, or by using up to a 20% casein solution. Alternately, the mixture may be allowed to stand for a short time prior to using, to allow part of the water content to be removed by hydration.

Aqueous dispersions of reclaimed rubber may be substituted for part of the natural latex, to improve ageing qualities and to reduce cost. Creamed and centrifuged latex may be used instead of evaporated latex, by properly stabilizing the mix and adjusting the aluminous cement to care for the added water. Synthetic rubber dispersions or latex may be used to good advantage in place of natural latex. In each case, it is preferred to provide sufficient aluminous cement to remove most of the water by hydration, so as to reduce evaporation to a minimum and thus avoid cracking during solidification. The use of adequate quantities of aluminous cement thus makes it possible to avoid harmful shrinkage during the setting process, to effect a rapid set and cure throughout the resilient material, and to provide a tight seal between the glass and the supporting structure.

I claim:

1. Means for removably securing window glass in a supporting structure, comprising a pane of glass having an inward and an outward face and an edge surface, a supporting structure, a slot in the supporting structure adapted to receive said edge of the glass, and the edge of said glass partially inserted in said slot; an inner surface of said slot opposite to said edge surface of the glass and suitably spaced therefrom, said inner surface sloped toward the glass in a direction to approach said edge surface at its juncture with said inward face and extending beyond said inward face without overlapping said edge surface, to permit removal of the pane of glass; a second surface of said slot overlapping said edge surface and a portion of said outward face to support said outward face; and a resilient joining composition between the glass and said surfaces of said slot, adhering thereto, said composition comprising material selected from the group consisting of latex rubber, dispersed reclaimed rubber and synthetic rubber, said material being admixed with aluminous cement to cause setting by hydration.

2. Means for removably securing window glass in a supporting structure, comprising a pane of glass having an inward and an outward face and an edge surface, a supporting structure, a slot in the supporting structure adapted to receive said edge of the glass, and the edge of said glass partially inserted in said slot; an inner surface of said slot opposite said edge surface of the glass and suitably spaced therefrom, said inner surface sloped toward the glass in a direction to approach said edge surface at its juncture with said inward face and extending beyond said inward face without overlapping said edge surface, to permit removal of the pane of glass; a second surface of said slot overlapping said edge surface and said outward face, to support said outward face; and a resilient joining composition between the glass and said surfaces of said slot, adhering thereto, said composition comprising material selected from the group consisting of latex rubber, dispersed reclaimed rubber and synthetic rubber, said material being admixed with aluminous cement to cause setting by hydration.

3. Means for removably securing window glass in a supporting structure, comprising a pane of glass having a first and second principal surface and an edge surface, said edge surface bevelled inwardly toward said first surface, a slot in the supporting structure adapted to receive said edge of the glass, and the edge of said glass partially inserted in said slot; an inner surface of said slot opposite said edge surface of the glass and suitably spaced therefrom, said inner surface sloped to substantially correspond with the slope of the bevelled edge surface of said glass and extending beyond said first principal surface of the glass without overlapping the juncture of said edge surface with said second principal surface, to permit removal of the pane of glass; a wall of said slot projecting from said supporting structure parallel with and overlapping a portion of said second principal surface, and suitably spaced therefrom; and a resilient joining material between the glass and the inner surfaces of said slot, adhering thereto, said material being selected from the group consisting of latex rubber, dispersed reclaimed rubber and synthetic rubber and admixed with aluminous cement to cause setting by hydration.

4. Means for removably securing window glass, comprising a supporting structure, a pane of glass, an edge surface of said pane of glass, a slot in said supporting structure adapted to receive said edge surface, and the edge of said glass inserted in said slot; within the slot a surface of the supporting structure opposite to said edge surface and suitably spaced therefrom, said surface of the supporting structure sloping toward a juncture of said edge surface and a principal surface of the glass, and suitably spaced from said juncture; said surface of the supporting structure also extending beyond said principal surface, the amount of slope being insufficient to cause overlapping of said edge surface, thus providing clearance for removal of the pane of glass in a direction perpendicular to said principal surface; between said glass and said surface of the supporting structure a resilient joining material selected from the group consisting of latex rubber, dispersed reclaimed rubber and synthetic rubber, said material being admixed with aluminous cement to cause setting by hydration; and a projection of said supporting structure overlapping a portion of the other principal surface of the pane of glass and suitably spaced therefrom; and within said space a resilient material, to provide a resilient support for said other principal surface.

5. Means for removably securing window glass, in a supporting structure comprising a pane of glass, an edge surface of said pane of glass, a slot in said supporting structure adapted to receive said edge surface, and the edge of said glass inserted in said slot and suitably spaced from the bottom surface of said slot; a side surface of said slot sloping outwardly from said bottom surface, and passing near a corner of said edge surface and a principal surface of said glass, to form a more restricted space at said corner; between said glass and said surfaces of said slot a resilient material admixed with aluminous cement to cause setting by hydration, said resilient material adapted to adhere to said glass and said surfaces, and to be removed therefrom by tearing at said restricted space to permit removal of the glass from said supporting structure.

6. A process for removably securing window glass having two face surfaces and at least one edge surface, in a supporting structure comprising initially positioning an edge surface of said glass in substantial alignment with a slot in said supporting structure, suitably spacing the said edge surface from the bottom surface of said slot, and positioning an edge of the glass formed by the juncture of said edge surface with one of said face surfaces near but not overlapping at least one side of said slot, to provide a restricted spacing between said edge and said side, and resting the other face surface of said glass against an extension of the other side of said slot; then filling said slot and said restricted space with a semi-fluid mixture of latex and aluminous cement, and causing said mixture to set by hydration into a resilient, elastic, adherent solid.

7. Means for removably securing window glass in a supporting structure, comprising a pane of glass having two face surfaces and an edge surface, a slot in the supporting structure adapted to receive said edge surface, said edge surface being in substantial alignment with said slot and suitably spaced from the inner surface thereof to receive a joining composition within said space; a side surface of said slot sloping outwardly beyond one surface of said pane and also positioned to not overlap said pane surface to put a joining composition therebetween in shear when said glass is forced toward said side and, to allow the insertion or removal of said glass in the absence of said joining composition; means for suitably bracing the other overlapping face surface of said glass against the other edge of said slot; and within said space a resilient joining composition selected from the group consisting of latex rubber, dispersed reclaimed rubber and synthetic rubber, admixed with aluminous cement to cause setting by hydration.

CHARLES A. PHIPPS.

REFERENCES CITED

The following references are of record in the file of this patent:

UNITED STATES PATENTS

| Number | Name | Date |
|---|---|---|
| 626,698 | Hayes | June 13, 1899 |
| 811,544 | Chancey | Feb. 6, 1906 |
| 852,604 | Hardee | May 7, 1907 |
| 1,093,580 | Veeder | Apr. 14, 1914 |
| 1,867,454 | Herman | July 12, 1932 |

FOREIGN PATENTS

| Number | Country | Date |
|---|---|---|
| 297,336 | Germany | Apr. 12, 1917 |